(12) United States Patent
Samartsev et al.

(10) Patent No.: US 10,193,296 B2
(45) Date of Patent: Jan. 29, 2019

(54) PASSIVELY MODE-LOCKED FIBER RING GENERATOR

(71) Applicant: IPG PHOTONICS CORPORATION, Oxford, MA (US)

(72) Inventors: Igor Samartsev, Westborough, MA (US); Andrey Bordenyuk, Northborough, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 23 days.

(21) Appl. No.: 15/536,170

(22) PCT Filed: Dec. 15, 2015

(86) PCT No.: PCT/US2015/065798
§ 371 (c)(1),
(2) Date: Jun. 15, 2017

(87) PCT Pub. No.: WO2016/100330
PCT Pub. Date: Jun. 23, 2016

(65) Prior Publication Data
US 2017/0365972 A1 Dec. 21, 2017

Related U.S. Application Data

(60) Provisional application No. 62/091,817, filed on Dec. 15, 2014.

(51) Int. Cl.
*H01S 3/06* (2006.01)
*H01S 3/067* (2006.01)
(Continued)

(52) U.S. Cl.
CPC ...... *H01S 3/06791* (2013.01); *H01S 3/06725* (2013.01); *H01S 3/06754* (2013.01);
(Continued)

(58) Field of Classification Search
CPC ............. H01S 3/06791; H01S 3/06725; H01S 3/06754; H01S 3/08013; H01S 3/08027;
(Continued)

(56) References Cited

U.S. PATENT DOCUMENTS 4,835,778 A 5/1989 Kafka et al.
6,643,299 B1 * 11/2003 Lin .......................... H01S 3/13
372/18
(Continued)

FOREIGN PATENT DOCUMENTS

JP 2006-324613 A 6/2008

OTHER PUBLICATIONS

Ennejan, T. and Attia. R., "Mode Locked Fiber Lasers", Current Developments in Optical Fiber Technology 15 (2013), pp. 405-426.
(Continued)

*Primary Examiner* — Armando Rodriguez
(74) *Attorney, Agent, or Firm* — Yuri B. Kateshov, Esq.; Timothy J. King, Esq.

(57) ABSTRACT

A pulsed fiber generator is configured with a unidirectional ring waveguide configured to emit a train of pulses. The ring waveguide includes multiple fiber amplifiers, chirping fiber components coupled to respective outputs of first and second fiber amplifiers, and multiple spectral filters coupled to respective outputs of the chirping components. The filters have respective spectral band passes centered around different central wavelengths so as to provide leakage of light along the ring cavity in response to nonlinear processes induced in the ring cavity. The pulse generator operates at a preliminary stage during which it is configured to develop a pitch to a signal, and at a steady stage during which it is configured to output a train of pulses through an output coupler at most once per a single round trip of the signal.

30 Claims, 5 Drawing Sheets

(51) Int. Cl.
   *H01S 3/11* (2006.01)
   *H01S 3/131* (2006.01)
   *H01S 3/08* (2006.01)
   *H01S 3/094* (2006.01)
   *H01S 3/0941* (2006.01)
   *H01S 3/10* (2006.01)
   *H01S 3/136* (2006.01)

(52) U.S. Cl.
   CPC ...... *H01S 3/08013* (2013.01); *H01S 3/08027* (2013.01); *H01S 3/0941* (2013.01); *H01S 3/094003* (2013.01); *H01S 3/10023* (2013.01); *H01S 3/1112* (2013.01); *H01S 3/131* (2013.01); *H01S 3/136* (2013.01)

(58) Field of Classification Search
   CPC ............ H01S 3/094003; H01S 3/0941; H01S 3/10023; H01S 3/1112; H01S 3/131; H01S 3/136
   See application file for complete search history.

(56) References Cited

U.S. PATENT DOCUMENTS

| | | | |
|---|---|---|---|
| 7,372,880 B2 | 5/2008 | Jablonski et al. | |
| 7,602,825 B1* | 10/2009 | Lin | H01S 3/1394 372/18 |
| 2002/0071454 A1* | 6/2002 | Lin | H01S 3/06791 372/6 |
| 2004/0114641 A1 | 6/2004 | Wise et al. | |
| 2012/0033690 A1 | 2/2012 | Renninger et al. | |
| 2014/0247448 A1 | 9/2014 | Wise et al. | |

OTHER PUBLICATIONS

Haus, Herman A., "Mode-Locking of Lasers", IEEE Journal on Selected Topics in Quantum Electronics, vol. 6, No. 6, Nov./Dec. 2000, pp. 1173-1185.

Winter et al., "Phase Noise Characteristics of Fiber Lasers as Potential Ultra-Stable Master Oscillators", Proceedings of 2005 Particle Accelerator Conference, Knoxville, TN, 2005, pp. 2521-2523.

Gordon et al., "Self-starting of passive mode locking" Optics Express, vol. 14,(23): Nov. 13, 2006, pp. 11142-11154.

Xu et al., "Observation of central wavelength dynamics in erbium-doped fiber ring laser" Optics Express, vol. 16, No. 10, May 12, 2008, pp. 7169-7174.

* cited by examiner

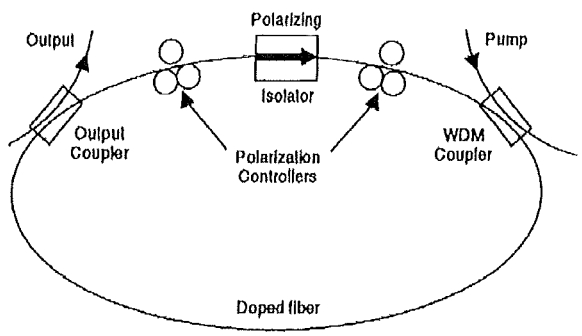
FIG. 1
Known Art
FIG. 2A
Known Art
FIG. 2B
Known Art
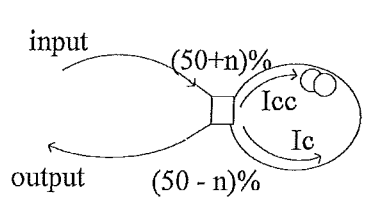 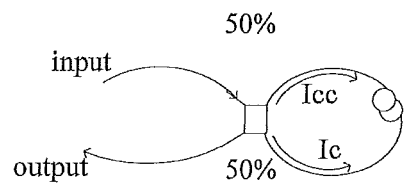
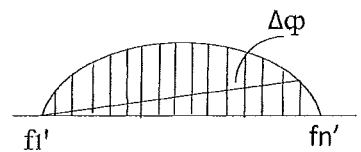
FIG. 3
Known Art

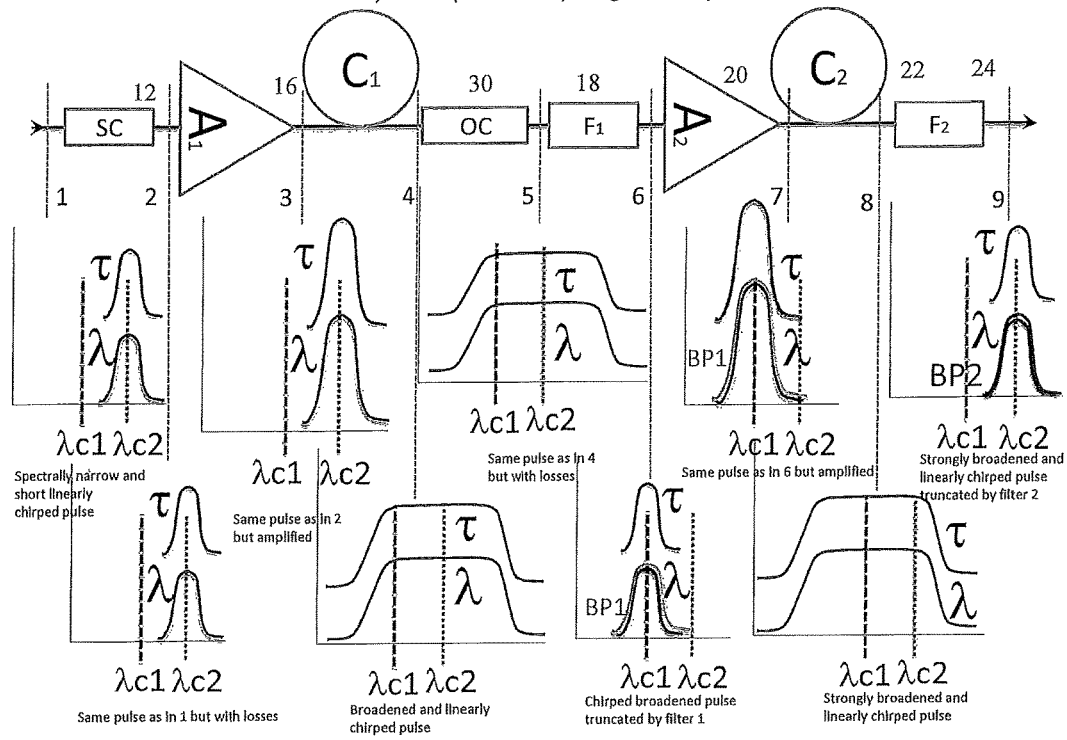
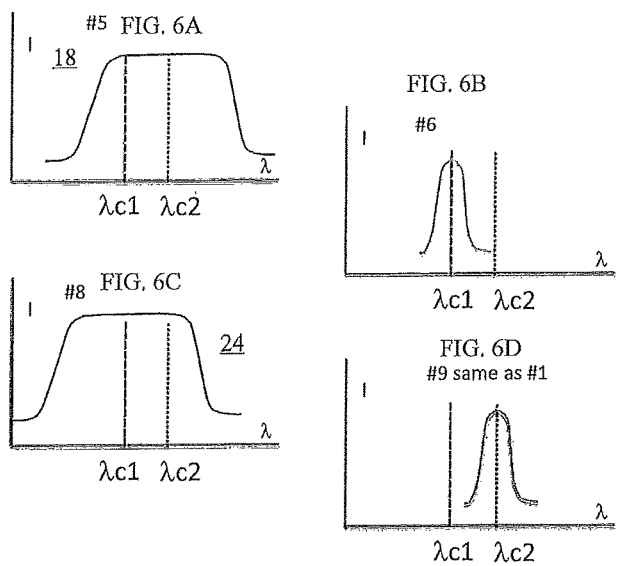

PASSIVELY MODE-LOCKED FIBER RING GENERATOR

BACKGROUND OF THE INVENTION

Field of the Invention

The invention relates to short pulse fiber ring laser systems. In particular, the invention relates to a passively modelocked fiber ring cavity configured to generate sub-nanosecond giant-chirped pulses

GLOSSARY

Anomalous dispersion of material refers to the material in which the refractive index increases with a gradually increasing wavelength.

Bandwidth is a wavelength range used to denote a specific part of the spectrum that passes incident energy.

Blocking Range is a wavelength interval used to denote a spectral region of energy that is attenuated by the filter.

Center Wavelength (CWL) is the midpoint between half of maximum amplitude at long and short wavelength slope.

Chirped pulse refers to the pulse in which the instant central wavelength (frequency) changes across the pulse in time domain.

Desired pulse is the pulse with the desired spectral width and duration generated in a ring cavity.

Dispersion refers to the dependence of the speed of light propagation in material (or the index of refraction) on the wavelength.

Isolator refers to the device allowing the transmission of light only in one direction.

Linearity, in common sense, refers to a mathematical relationship that can be graphically represented as a straight line, as in two quantities that are directly proportional to each other.

Linear frequency chirp refers to the pulse in which the frequency changes linearly across the pulse in time domain.

Nonlinearity is the interaction of light with matter in the regime where the response of the material to the applied electromagnetic field is nonlinear in the amplitude of this field.

Nonlinear phase acquisition refers to a nonlinear gain of phase over amplitude of the electric field; one of the manifestations of the nonlinear phase acquisition is broadening of a spectral component of light pulse due to Self-Phase modulation nonlinear phenomenon.

Normal (positive) dispersion of material refers to the material in which the refractive index decreases with a gradually increasing wavelength.

Optical filters are configured to selectively transmit light in a particular range of wavelengths, while blocking the remainder. They can usually pass long wavelengths only (longpass) filters, short wavelengths only (shortpass) filters.

Optical path is the product of geometrical path and a refractive index.

Periodicity (Boundary) condition of the oscillator is the repeatability of pulse parameters after each single pass over the ring-cavity.

Phase is the fraction of the wave cycle which has elapsed relative to the origin.

Phase shift refers to two multiple waves that do not line up. Phase shift may be caused by a difference in optical paths of respective identical waves.

Pitch refers to a developing pulse of light guided along the ring cavity during preliminary having different characteristics at any given point of the ring cavity from one round trip to another round trip.

Pulse duration $\tau_p$ is the width of the time interval within which the power is at least half the peak power (FWHM). Ultra-short pulses are pulses in picosecond-femtosecond pulse duration range.

Pulse energy is the product of the peak power and pulse width (it is right in square pulse approximation, however, as we are talking below about fraction of pulse with higher instant intensity to explain performance of NALM we should rephrase this as "Area under temporal pulse intensity curve), essentially the area within the pulse.

Q-factor generally is the ratio of the stored energy to the energy dissipated per round trip.

Spectral Domain is the characteristic of a light pulse describing a finite spectral width (bandwidth) even in the pulse with the instantaneous frequency being constant (i.e., pulse without chirp).

Self-phase modulation (SPM) is a phenomenon that results from the dependence of the refractive index of a medium on the intensity of a light pulse and is manifested by spectral and temporal modulation including broadening of the light pulse.

Self-similar pulse ("similariton") refers to the parabolic pulse that is capable of converting phase acquired in non-linear process into a linear frequency chirp.

Signal refers to the pulse of light developed from the pitch and characterized by continuously changing parameters during a single round trip, but having the same characteristics at any given point of the ring cavity during consecutive round trips.

Short pulse refers to the pulse having the duration in a sub-nanosecond range.

Soliton refers to the chirped pulse that preserves its temporal and spectral shape while propagating throughout a ring cavity.

Temporal domain is the characteristic of a light pulse related to an optical power P, i.e., energy per unit time that is appreciable only within short time interval and is close to zero at all other times.

Transient pulse is a developing pulse guided around the ring cavity and having spectral width and duration different (it can be smaller or bigger especially in time) than those of the desired pulse.

Technological Landscape

Short-pulse fiber laser systems, offering innovative architectures and higher pulse peak intensity combined with high pulsing frequencies repetition rates, help manufacture components with unprecedented quality, accuracy and speed. Owing to the short duration of pulses, the laser energy can be input to the material in a shorter time than heat can be deposited which thus prevents thermal damage to the part. Not surprisingly, industrial sub-nanosecond laser systems find wide applications from the medical device market to many other major industries.

A pulsed laser system is necessarily configured with a pulse generator or oscillator having a laser cavity. The frequencies circulating in the cavity and having more gain than losses are called longitudinal modes and can be considered as an assembly of independent oscillators. While circulating in the cavity, the longitudinal modes are separated by $\Delta F=v/L$ for a fiber laser configured with a ring cavity which is of particular interest here, where L is the cavity length and v is the light speed. When these modes oscillate independently of each other, the laser emits continuously. However, when a fixed phase shift exists between the various modes, the cavity emits a pulses train and becomes mode-locked.

Several methods for generating ultrashort pulses are well known. One of these methods—passive mode locking—is part of the disclosed subject matter. The key to the passive modelocking is the presence in a ring cavity of at least one component that has a nonlinear response to increasing peak intensity. Several architectures are known to carry out the passive mode locking method.

One of these architectures is the nonlinear polarization rotation (NLPR) which can be better understood using the ring cavity shown in the FIG. 1. The polarizing isolator placed between two polarization controllers acts as the mode-locking element. It plays the double role of an isolator and a polarizer such that light leaving the isolator is linearly polarized. The polarization controller placed after the isolator changes the polarization state to elliptical. The polarization state evolves nonlinearly during propagation of the pulse because of self-phase and cross-phase induced phase shifts imposed on the orthogonally polarized components. The state of polarization is non-uniform across the pulse because of the intensity dependence of the nonlinear phase shift. The second polarization controller (one before the isolator) is adjusted such that it forces the polarization to be linear in the central part of the pulse. The polarizing isolator lets the central intense part of the pulse pass but blocks (absorbs) the low-intensity pulse wings. The net result is that the pulse is shortened after one round trip inside the ring cavity. Thus the polarization-dependent isolator, working together with the birefringence fiber, can generate an intensity-dependent loss.

A variety of ultra-high-energy pulses can be successfully generated by using NLPR architecture including solitons, gain-guided solitons usually with cavity dispersion purely normal, and similaritons. However, the polarizing controllers require complicated feedback with fine control system. The NLPR process is sensitive to environmental changes and packaging conditions. As a consequence, it is difficult to satisfy periodicity conditions, i.e., reproducibility of pulse characteristics at a consistent location after each round trip of the laser cavity.

The interferometric fiber architecture has two general types: the nonlinear optical loop mirror (NOLM) shown in FIG. 2A and the nonlinear amplification loop minor (NALM) seen in FIG. 2B. Both of these devices operate in accordance with Sagnac interferometer operation. The latter is constructed from a fused fiber coupler whose output ports are spliced together to form a loop and the counter-propagating intensities Ic (clockwise) and Icc (counterclockwise) are made unequal either by the coupler splitting not equal 50% (NOLM) or by the inclusion of an in-line fiber amplifier closer to one of the ports of the coupler (NALM).

The optical replicas with unequal intensities acquire a differential phase shift, due to the nonlinear refractive index. For example, in FIG. 2A, the coupler splits light intensity of the signal between (50−n) % (Icc) carried in the counter-clockwise propagating replica with intensity Icc and (50+n) % (Ic) in the clockwise replica. Thus if Ic of the clockwise replica is sufficiently intense to trigger a nonlinear response of the fiber, i.e., to induce SPM, and Icc of the other replica is low, a significant differential phase shift will accumulate between the parts of counter-propagating replicas having different instant intensities. Propagating through fused coupler, the replicas interfere with one another. Only fractions of replicas gaining non-matching phases, which correspond to high intensity pulse tips, constructively interfere as a result of SPM process during their propagation over the loop thus forming known a NALM.

The lasers, configured in accordance with interferometric mode-locking architectures, represent a relatively new, rarely used structure which renders the discussion about practical advantages or disadvantages of this particular approach rather difficult. However, the NOLM/NALM architecture, like the NLPR may not have the desired stability, i.e., the output pulses may not be uniform. The pulse non-uniformity leads to a poor laser performance. Furthermore, the NOLM/NALM architecture, like NLPR, is neither simple nor particularly cost-effective.

A need therefore exists for a completely new architecture operative to carry out passive mode locking in a ring cavity pulse generator which has a simple, rugged structure capable of outputting uniform and high-energy sub-nanosecond pulses of light.

BRIEF SUMMARY OF THE INVENTION

In contrast to all known architectures designed to generate a chirped pulse, the disclosed ring cavity does not have a single individual element which has a nonlinear response. In other words, as the pulse propagates through each individual element, the intensity of a spectral component changes only linearly.

The nonlinear effect in the inventive structure is a result of generation of new spectral components during the pulse evolution inside a ring cavity. It is these new spectral components that make the pulse passing through two spectral filters, which are centered on different central wavelengths, have its peak intensity change nonlinearly. The new spectral components make the process of mode synchronization highly competitive, due to low losses for mode locking, compared to other types of generation, like CW and Q-switching.

The inventive structure may generate various types of pulse including solitons, similaritons and others and is particularly beneficial to the generation of ultrashort pulses with a giant chirp. For the giant chirped pulse generation, two steps are important for establishing a passive mode locking regime of a short pulse generator: (a) filtering out a spectrally narrow pulse from a broader pulse, and (b) broadening the formed narrow pulse both in frequency and time domain due to nonlinear effects affecting light in a long fiber. The result of these two steps is a linear positively chirped pulse of FIG. 3, i.e., the pulse which is broadened in both spectral and temporal domains when compared to the initial pulse, and has a carrying frequency linearly varying across the pulse. The linearity of the carrying frequency is important for further compression of thus stretched pulse.

The reason for outputting a chirped pulse is well known to one of ordinary skill in the laser art—it is necessary to somewhat decrease the pulse peak intensity available from lasers (and amplifiers) because otherwise deleterious non-linear effects and optical damage would undermine the operation of the pulse generator (and amplifier). The solution to this problem was found by stretching the pulse duration or chirping, keeping peak power at safe levels, and then compressing the output pulse to the original duration after subsequent one or multiple amplifying stages.

The inventive generator of giant chirped pulses is configured with a ring fiber waveguide or cavity guiding light in one direction. The fiber waveguide includes a fiber isolator providing the desired directionality of light propagation within the ring fiber waveguide. A plurality of fiber components all constituting the ring fiber waveguide are organized in multiple fiber chains each necessarily including one amplifier, one fiber coil and one spectral filter. During a start-up stage of the inventive pulse generator, in response to etalon pulses launched from an external seed source or artificially induced noises by pumps, spontaneous emission is amplified (ASE) in a first fiber amplifier within the desired spectral range which is characterized by a continuous wave (CW) component and pitch component(s). Propagating through a first fiber coil, the pitch is somewhat spectrally and temporally broadened and further spectrally filtered in a first filter. For example, a long wavelength sub-region of the pitch is filtered out from further propagation in the desired direction.

The filtered pulsed component is further amplified in a second amplifier to a peak intensity sufficient to induce a self-phase modulation (SPM) nonlinear effect while propagating through the second fiber coil. The SPM is manifested by spectral and temporal broadenings of the pulsed component which is manifested by generation of new frequency components or modes around a center component. Some of the newly generated frequency components partially overlap the frequency bandpass of the second filter which, in contrast to the first filter, cuts off the short wavelength sub-region of the pitch. The generation of new spectral components becomes possible only at certain peak intensities of pitches, i.e., pitches with synchronized modes, sufficient to induce a self-phase modulation phenomenon.

The circulation of the pitch may continue through the first group of the first amplifier, fiber coil and filter combination configured again to respectively amplify, spectrally and temporally broaden and finally filter out the developing pulsed component. The thus developing pitch is finally amplified in the second amplifier to the desired peak intensity which is instrumental in such a broadening of the pitch that it fully covers the bandpass of the second filter. At this point, the pitch spectrally develops to the desired signal with a somewhat reduced peak intensity lost in the second filter but fully compensated in the following first amplifier. The predetermined percentage of subsequent spectrally and temporally expanded signal in the first fiber coil is guided outside the ring waveguide as a pulse with the desired spectral width, intensity and energy to be further amplified in at least one amplifying stage before being spectrally compressed.

The startup of the disclosed pulsed generator requires an external source to create noises which, when amplified, are operative to create the spectral broadening of the evolving pulse compared to the spectra of continuous wave generation. In the inventive structure low frequency noise or CW generation cannot be substantially amplified due to the operation of multiple spatial filters having the narrow line bandpasses but different central frequencies compared to a steady state spectrum of the pulsed regime. The configuration of the start-up scheme in the inventive pulse generator depends on a type of the external noise-generating source. In particular, the spectral relationship between multiple filters is a direct result of the external source's configuration.

In one start-up scheme, the external source, such as a diode laser, operates as a pump outputting light at a wavelength different from the operating wavelength of the disclosed pulse generator. In this embodiment, the inventive pulse generator is configured with the spectral filters that have overlapped bandpasses. This configuration of the filters provides the discrimination of CW narrow line generation, which may be spontaneously formed from quantum or other type of noise, and/or of Q-switch pulses with a prohibitively high energy.

However, the CW component plays an important role in proper functionality of the disclosed pulse generator during transient stage of laser mode locking. The amplifiers each are characterized by a significant accumulation of energy. A pitch passing through these amplifiers may have a prohibitively high peak intensity at the amplifier's output which can lead to a complete destruction of not only the pulse generator but also the following amplifying stages. To somewhat decrease this accumulated energy, it is desirable to reduce population inversion in a gain medium. This is realized by the CW component that may be provided with an insignificant gain to reduce the overall accumulated energy in the amplifiers. The reduced accumulated energy contributes to a decreased pulse peak intensity and energy of the pitch. Having the unfiltered spectral region formed between the overlapped bandpasses of respective filters allows the CW component to be guided through this region along the ring waveguide and accomplish the reduction of accumulated energy.

A further aspect of the embodiment featuring the CW pump relates to the amplification of spontaneous emission in the desired spectral region allowing the pitch to pass through the predetermined (and uniform) spectral width of both filters. Such amplification in the desired spectral region is assured by a special form of pump light. Initially, the pump output is controlled to emit a high power short duration of tens of microseconds to millisecond pump pre-pulses to initiate noises within a required spectral region. The pre-pulse is thus needed to populate phase space of noise distribution in frequency and time domain. Subsequently, a current signal at the input of the pump is interrupted and the energy provided in the pre-pulse(s) is sufficient to amplify one or more small intensity peaks within the desired spectral region corresponding to the bandwidth of both filters. Thereafter, the pump outputs a CW radiation with the amplitude lower than that of the initial pump signal(s) which allows the pitch to develop into the desired signal and establish the mode-locked regime.

In a further embodiment, the start-up scheme is provided with a seed launching an etalon pulse or pulses at the operating wavelength of the pulse generator. These pulses are guided along the ring waveguide at a repetition rate that can be the same as or different from pitches generated in the ring waveguide in response to pump light from a pump which is turned on sometime after the seed. After the seed is switched off and these etalon pulses disappear but not before the excess of energy stored in the amplifiers is reduced to appropriate safety levels to prevent the generation of Q-switched pulses. In this embodiment the filters may or may not have the respective bandpasses overlap.

In a steady self-starting regime of generation of dissipative solitons or similaritons, the disclosed pulse generator operates similar to other ring architectures, such NOLM/NALM and NLPR, each having an individual nonlinear element. This is because in the stable regime, such an element does not substantially affect on the evolution of a pulse, but is necessary only for the pulse formation from noise. But in the stable regime, the inventive pulse generator is operative to output the desired chirped pulse at most once each round trip, which is in contrast to linear cavities where signal light repeatedly passes through the cavity. The realization of such an output includes either one output coupler positioned immediately downstream from either of fiber coils or two output couplers which are located immediately downstream from respective fiber coils. In case of two output couplers, the chirped pulse is coupled out of the ring waveguide each half a round trip.

BRIEF DESCRIPTION OF THE DRAWINGS

The above and other features of the disclosed pulse generator will become more readily apparent from the following specific description accompanied with the drawings, in which:

FIG. 1 is a known configuration of pulse generators based on the NLPR architecture;

FIGS. 2A and 2B are known configurations of respective NOLM and NALM architectures;

FIG. 3 is a known linearly chirped pulse;

FIGS. 5A-5C illustrate the principle of operation of the pulse generator in start-up and stable pulse generating regimes;

FIGS. 6A-6D illustrate signal spectra as it passes through the filters of the pulse generator of FIGS. 4 and 5C;

SPECIFIC DESCRIPTION

By way of introduction, the disclosed passively mode-locked pulse generator is configured with a novel architecture including multiple special filters which, in combination with one another, produce a nonlinear response enabling a stable mode-locked operation.

Figure 4:
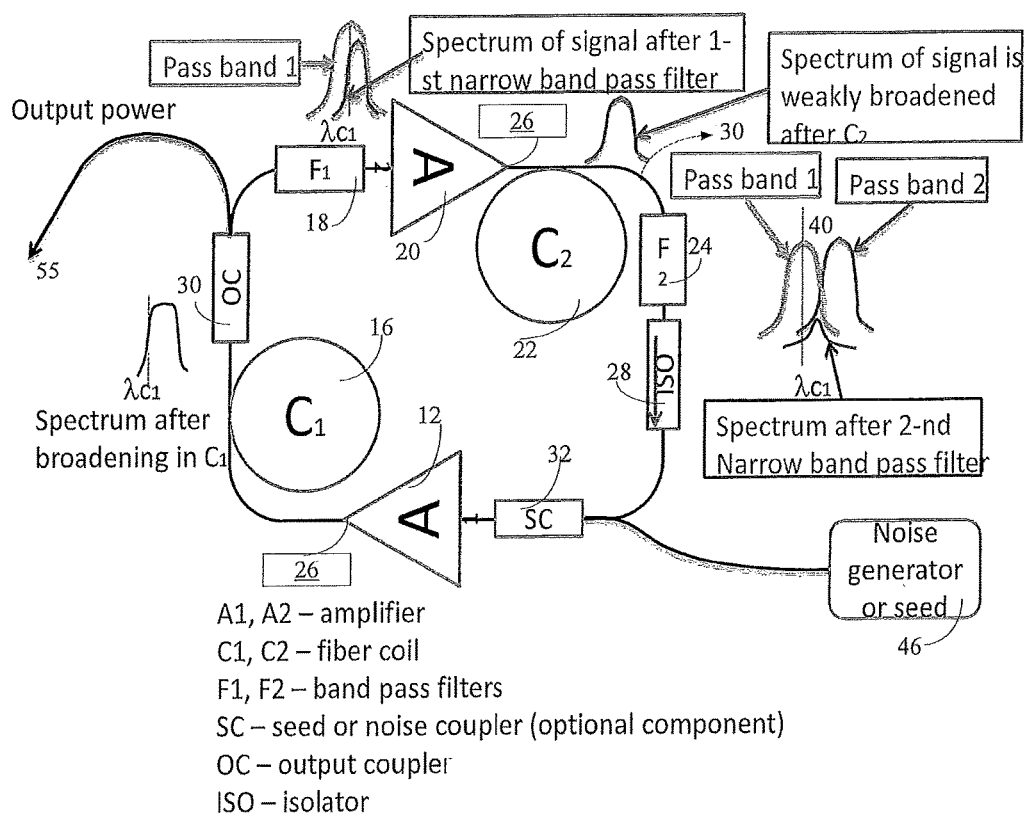
FIG. 4 is an optical schematic of the inventive pulse generator.

FIG. 4 illustrates the inventive pulse generator configured with a ring waveguide or ring cavity 10 in which output of one of multiple fiber amplifiers 12 and 20 seeds the other fiber amplifier. Between the first and second amplifiers 12 and 20, two or more identical groups or chains of fiber elements are coupled together to define ring cavity 10. Besides the fiber amplifier, each chain includes a fiber coil 16, 22 which provides respective periodic spectral and temporal broadening of signal, and narrow line filters 18, 24 operative to spectrally filter the broadened signal. The configuration of the filters is well known to one of ordinary skill and generally includes a relatively thick mirror with a plurality of dielectric layers capable of passing only the desired spectral range and, if needed, introducing either a normal or anamolous dispersion, as discussed hereinbelow. The filters may have substantially the same bandwidth. Alternatively, one of the filters may be configured with a bandpass which is at most five (5) times broader than the bandpass of the other filter. Furthermore, the bandpass of each of the filters should be from 2 to 10 times narrower than that of output pulse 55. However, in some cases, the desired pulse width can be narrower than the bandpass of the filters. The sequence of spectral broadening and filtering is necessary to generate pulses with a giant chirp having the desired spectral width, pulse duration and energy, which is one of the objects of the present invention. The ring waveguide 10 further includes one or more isolators 28, providing the unidirectional guidance of light around the waveguide, and one or more output couplers 30 positioned immediately downstream from respective fiber coils 16, 22. The output couplers each guide the chirped pulse 55 outside ring waveguide 10. The decoupled pulse 55 may further be amplified in one or more amplifying stages. To create the desired population inversion in a gain medium of the amplifiers, i.e., to start the operation of the inventive pulse generator, one or two CW pums 26 are optically coupled to respective amplifiers. All of the above-disclosed components are interconnected by single transverse mode (SM) fibers. The operation of the disclosed pulse generator will be discussed hereinbelow and includes nonsaturated start-up and saturated steady-state pulse generation (modelocked) phases.

Figure 5A:
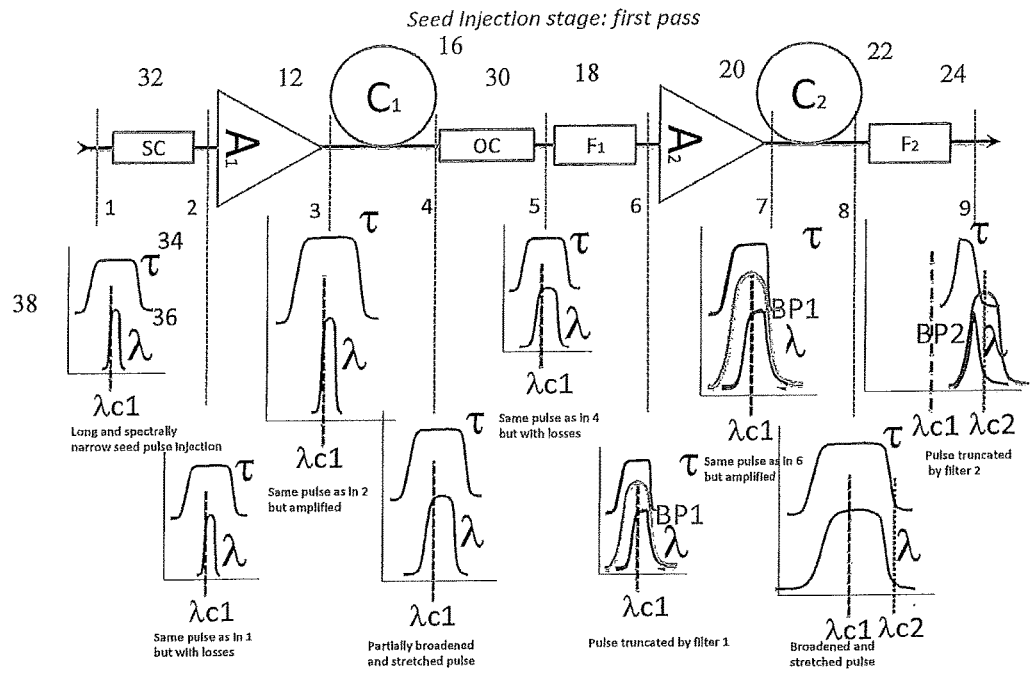
Figure 5B:
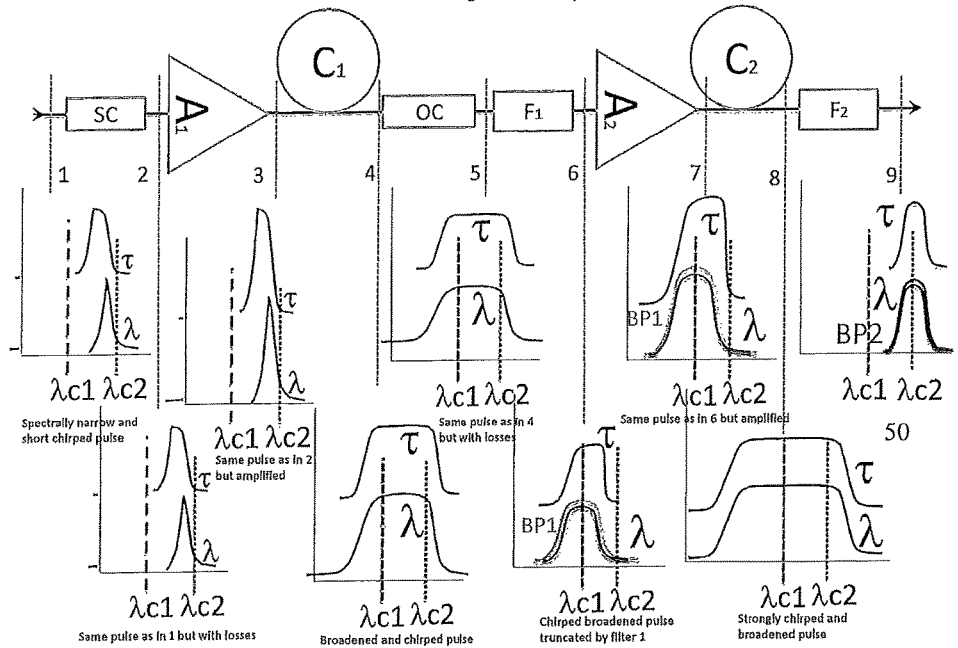

Referring to FIGS. 5A and 5B in addition to FIG. 4, the start-up phase includes seed injection (FIG. 5A) and transient stages (FIG. 5B). The start-up phase provides a spectral broadening of a pitch within the desired spectral range such that its spectral width becomes broader than that of the CW generation. The invention discloses two different configurations of a startup architecture.

One of the startup configurations includes two CW pump sources 26 (FIG. 4), such as CW diode lasers or CW fiber lasers. The pumps 26 each output pump light coupled into a gain medium of amplifier 12, 20 at a wavelength $\lambda p$ shorter than an operating wavelength $\lambda o$ of the desired chirped pulse which is output through output coupler 30 during the steady-state phase of the pulse generator. The graphical representation of the pitch evolution during the start-up phase shown in FIGS. 5A-5B is not precise, but rather intended to illustrate general trends helping the understanding of the processes within the ring waveguide.

Turning specifically to FIG. 5A, as the gain medium of one or both amplifiers receives pump light, the pulse generator starts operation in a continuous way, but with significant fluctuations of the laser noise in the desired spectral region of the CW radiation. The latter has its spectra featuring one or more low intensity pitches 38 (only one is shown) each being stretched in time domain 34 and having a narrow spectral linewidth 36, as shown in step 1-2. As the noise within the desired spectral region runs through input coupler 32 (step 2), pitch 38 undergoes only slight spectral broadening. Note that due to multiple pumps 26, two signal-developing processes, i.e., pitch to signal, occur in the ring waveguide practically simultaneously or within a very short time delay, but for the clarity purposes, only one of the processes is further disclosed in detail.

In step 3 of the seed injection stage, first amplifier 12 is operative to increase a peak intensity of pitch 38. Propagating further through first coil 16, pitch 38 spreads out in the time domain and spectrally broadens in the frequency domain, as shown in step 4, due to a relatively weak self-phase modulation nonlinear effect (SPM) which is induced by the increased peak intensity. However, the latter is still not sufficient for a substantial spectral broadening. The thus amplified and broadened pitch 38 (at his point, the power losses at output coupler 30 are insignificant as shown in step 5) is further coupled into first filter 18. The latter is configured, for example, to discriminate long wavelengths of the desired frequency range, i.e., it passes a sub-region of short wavelengths while blocking the longer ones, as shown in step 6. Of course, filter 18 may be configured to block short wavelengths while passing a sub-region of long ones.

The transient pulse at the output of first filter 18 is further seeded in second amplifier 20 which significantly increases the peak intensity of the pitch, as shown in step 7. The latter, in turn, induces a phase modulation in second fiber coil 22 which is stronger than that in first fiber coil 16, as shown in step 8. In fact, newly generated frequency components along a leading (long wavelength) edge of pitch 38 enter the passband of second filter 24 which is configured to discriminate short wavelengths in this exemplary scheme, as seen in step 9. At the output second filter 24 the modes of the pitch have a fixed phase relationship, i.e., the modes are synchronized. Yet, neither the peak intensity nor spectral width of pitch 38 has yet reached the desired threshold.

Turning now to FIG. 5B, the transient stage begins where the previous nonsaturated seed injection stage ends. The pitch from filter 24 is coupled into first amplifier 12 where its peak intensity is again increased to a level sufficient to induce the SPM effect which results in generating new frequencies in first fiber coils 16. Comparing identical steps 4 of respective FIGS. 5A and 5B, it is clearly seen that the pitch is substantially broadened in spectral domain and stretched in time domain during the transient stage when compared to the seed injection stage However, the spectral width of the pitch 38 may still be insufficient to fully cover the passband of first filter 18 which, thus, again cuts long wavelengths of the passing transient pulse. The second amplifier 22 finally increases the peak intensity to the desired level which is sufficient to broaden the spectral width and duration of the pitch to respective desired spectral width and duration as it propagates through second fiber coil 22. Having reached the desired spectral width, the pitch is fully developed to a signal 50 having the spectral width after the second coil fully covering the bandpass of filter 24. As discussed above, the start-up step is disclosed as having one or more round trips of pitch 38 before it is fully developed to the desired signal. In principle, under certain conditions, half a round trip may be sufficient for the formation of the desired signal 50 which, in this case, would be fully formed in the seed injection stage.

While the above description highlights the pulse development, the CW component plays a vital role in the above-discussed start-up architecture. The ring cavity 10 is configured with a high quality factor Q which means the accumulation of high energy in fiber amplifiers. If this energy is not reduced, the inventive ring waveguide will produce Q-switched pulses having such a high level of energy that the pulse generator can be easily destroyed. The energy decrease is realized by a specific configuration of two filters 18 and 24 of FIG. 4. The central wavelengths $\lambda c1$, $\lambda c2$ of respective filters are selected so that the passband of one of the filters overlaps the bandpass of the other filter, as shown in FIG. 4. The overlapped spectral region 40 between two filters allows propagation of the CW component which consumes the excess of energy accumulated in both amplifiers. However, the amount of the CW component should be amplified so that it does not compete with the main modelocking process. The overlapped region passes no more than 10% of the maximum filter transmittance of that filter which has the highest transmittance, but preferably not less than 0.1% of the filter with the lowest transmittance, if the filters have respective transmittance amplitudes different from one another. However the filters may be configured with the same transmittance amplitude. In summary, two filters 18 and 24 having respective passbands, which overlap one another, function in tandem to 1. suppress the CW radiation, and 2. develop the pitch to the desired signal in a stable modelocked regime.

Figure 7A:
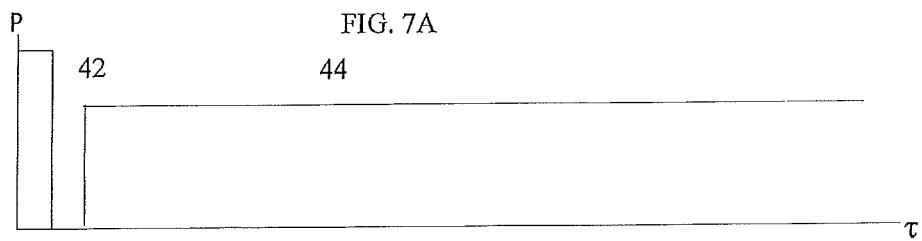
FIGS. 7A and 7B illustrate the principle of operation of an external source in different start-up schemes of the inventive pulse generator.

FIG. 7A, discussed in combination with FIG. 4, illustrates a further feature of the above-disclosed startup architecture and relates to the amplification of the pitch or pitches in the desired frequency region. Indeed, nobody knows how much time is needed to start amplifying a weak pitch within a broadband low frequency noise that eventually ends up within the desired wavelength range of the filters. To ensure that a developing pitch is within the desired wavelength range, pumps 26 each have a current-modulated input. Initially, high amplitude and short duration launching pre-pulse or prepulses of pump light 42 (FIG. 7A) of a fraction of millisecond to several milliseconds is coupled into ring waveguide 10 (FIG. 4) and then the input to pump 26 is interrupted for about the duration of the initial pump light. Such a switch-on/switch-off operation allows the instantaneously accumulated energy to be distributed over a wide range of broadband low frequency noise necessarily amplifying one or more transient pulses within the desired frequency region. Thereafter the pump 26 is again switched on and operates without interruption in a CW regime outputting CW pump light 44 with the amplitude lower than that of the pre-pulse for as long as the pulse generator operates. The CW pump amplitude may vary to adjust the parameters of the output signal.

Figure 7B:
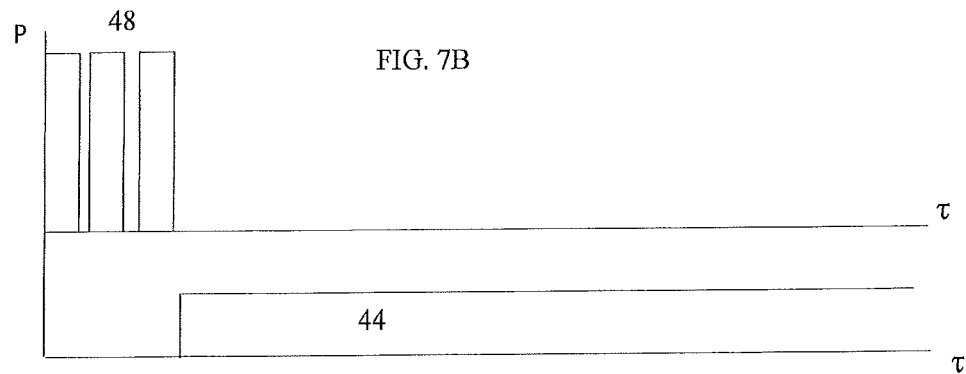

Referring to FIGS. 4 and 7B, an alternative configuration of the starting-up stage, in addition to pumps 26, includes a seed or seeds 46 (FIG. 4), which are turned on before pumps 26 start operating, outputting one or more uniform etalon pulses of pump light 48 (FIG. 7A). The etalon pulses gradually decay after the seeds are deenergized soon after the pumps start emitting CW pump light. This configuration, like the previous one, helps lower the energy accumulated in fiber lasers 12 and 20 t prevent the generation of Q-switched pulses. The etalon pulses propagate through ring waveguide 10 at a repetition rate of switching the seed on and off which is different from the one at the desired pulses are decoupled from the ring cavity. The use of seed 46 may also somewhat alter the configuration of ring waveguide 10. The altered structure of waveguide 10 may have filters 18 and 24 configured with respective bandpasses that do not overlap one another. However, such a modification is not necessary, and the unaltered structure of ring waveguide 10 disclosed in reference to FIG. 7A is also suitable for carrying out this second embodiment.

Referring to FIGS. 5C and 6A-6D, the steady stage of the disclosed pulse generator, as here shown, starts immediately upon forming signal 50 with the desired spectral width at the end of the transient stage. The desired spectral width of signal 50 in case of the overlapped bandpasses of respective filters is such that a part of the developed signal propagates through the overlapped region. In case when the bandpasses are not overlapped, the desired spectral width of the signal is such that it overlaps with bandpass of the consecutive filters.

In particular, when signal 50 passing through filter 18 (FIG. 6A), the latter filters out all long wavelength modes leaving signal 50 centered on central wavelength $\lambda 1$, as shown in FIG. 6B. Upon further amplifying and spectral broadening, signal 50 acquires new frequencies sufficient to overlap the entire bandpass of filter 24, which, in contrast to filter 18, blocks further propagation of all short wavelength (FIG. 6C). As a result, signal 50 is now centered on second central wavelength $\lambda 2$. The process of further amplifying and spectral broadening repeats itself every half a round trip of signal in the ring cavity.

Once signal 50 is developed, it makes no more than a single round trip around ring cavity 10 before output coupler 30 (FIG. 4) guides pulse 55 outside the cavity. Preferably, the latter may have additional output coupler 30 directly connected to the output of second fiber coil 22 as shown in dash lines in FIG. 4. Such a configuration allows decoupling of the pulse 55 every half a round trip.

The above-disclosed pulse generator may operate at any desired operating wavelength depending on the ions of rare earth materials which are used in the gain medium of amplifiers 12 and 20. Given only as an example, these rare earth materials may include ytterbium, erbium, and thulium. However, all other rare earth materials known as light emitters can be as successfully used as the above listed materials. Structurally, in addition to two fiber chains, it may be beneficial to use additional fiber chains to ensure the uniform peak power of the decoupled signal light pulses.

The fiber components of ring waveguide 10 may be configured to have a positive net dispersion. The latter is particularly advantageous in a one-micron wavelength range, where all of the components have the normal dispersion. However, referring to FIG. 4, it is possible to use the disclosed pulse generator in a one-micron wavelength range having one of the shown elements with a negative dispersion which does not affect the overall positive net dispersion. For example, the positive net dispersion may be obtained by configuring every component of ring waveguide 10 to have a positive (normal) dispersion. Alternatively, one or more components may have an anomalous (negative) dispersion, but the latter does not change the overall positive net dispersion of the ring cavity. For example, filters 18 and 24 each or both may be configured to have an anomalous dispersion and still be successfully used in a one micron wavelength range. The net dispersion of waveguide 10 may be anomalous with all or majority of the waveguide components configured to have an abnormal dispersion. Finally, the net dispersion of ring cavity 10 may be zero.

Preferably all of the fiber component of waveguide 10 are configured in a polarization maintaining (PM) format. Yet, either some of those components or all components may not be PM components.

Figure 8:
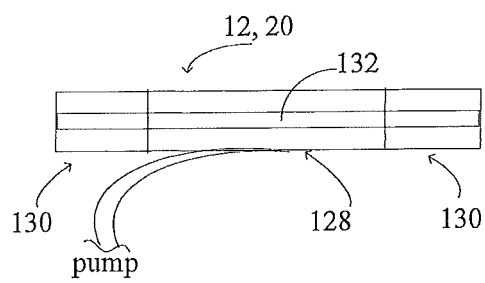
FIG. 8 illustrates a schematic of gain block incorporated in the disclosed pulse generator of FIG. 4.
Figure 9:
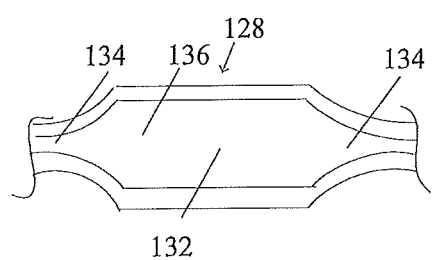
FIG. 9 illustrates a schematic of altered gain block in the laser of FIG. 4.

Referring to FIGS. 8 and 9 amplifiers 12 and 20 each include a combination of rare-earth ion doped fiber 128 having its opposite ends which are spliced to respective input and output passive fibers 130. The fiber 128 has a core 132 capable of supporting only a single transverse mode or multiple transverse modes (MM). However, at the desired operating wavelength, for example 1.06 micron, core 132 of the MM fiber 128 is configured to support only one fundamental mode by choosing a right dopant profile. In other words, when SM light is coupled into MM core 132 of active fiber 128, it excites only a fundamental transverse mode which, as known to artisan, has close to Gaussian shape intensity profile similar to that of SM fibers. The thus generated pulses 55 (FIG. 4) are emitted from the pulse generator in a single transverse mode. Alternatively, fiber 128 may have a SM core in a side pumping scheme.

The MM fibers provide amplifiers with the opportunity to use a side-pumping scheme which may have certain advantages over an end pumping scheme with necessarily in conjunction with the SM active fibers. First, the side-pumping scheme does not require the use of wavelength division multiplexer (WDM) that can tolerate only limited powers. As a consequence, the other advantage of the side pumping scheme is the possibility of generating pulses with powers higher than those of SM active fibers, which of course may be an alternative to the MM active fibers. However, one of ordinary skill in the art can easily realize a well-known end pumping technique.

FIG. 9 illustrates MM active fiber 128 having a double bottleneck-shaped cross section. This modification provides a central enlarged core part 132 with a greater diameter than that of core ends 134. The enlarged core part 132 provides for greater pump powers and reduced fiber lengths which minimizes the probability of coupling between fundamental and high order modes. The core ends 134 are configured similar to the ends of FIG. 7 and each have an MFD matching that of SM passive fibers.

The elements constituting ring waveguide 10 may have positive, negative, and zero dispersion and a combination of these. For example, as known from a co-pending U.S. application. . . . to configure the ring cavity having a total positive dispersion in order to use it in a 1 micron wavelength range. The ring cavity includes a plurality of fiber components with different types of dispersion which in totality provide the ring cavity with the positive dispersion.

The reader's attention is directed to all papers and documents which are filed concurrently with this specification and which are open to public inspection with this specification, and the contents of all such papers and documents incorporated herein by reference.

The invention claimed is:

1. A fiber pulse generator for emitting a train of pulses each with a desired spectral width, duration and energy, comprising a plurality of fiber chains connected to one another to define a ring cavity which unidirectionally guides a signal therealong, the fiber chains each being configured with:

a fiber amplifier operative to increase an intensity of the signal to a desired intensity, an optical fiber receiving the signal with the desired intensity sufficient to broaden a spectral width of the signal to a desired spectral width at an output of the optical fiber, and a spectral filter coupled to the output of the optical fiber and having a bandpass, wherein the bandpasses of respective optical filters of the fiber chains are centered on respective frequency components spectrally spaced from one another to allow the signal to sequentially overlap the bandpasses of respective filters, at least one of the fiber chains including an output coupler which is directly coupled to the output of the optical fiber and configured to guide the pulses with the desired spectral width, duration and energy outside the ring cavity.

2. The fiber pulse generator of claim 1 further comprising:

a plurality of pumps each launching a CW radiation which is coupled into the fiber amplifier and has a wavelength differing from that of the pulses; and a plurality of seed sources each outputting respective etalon pulses to initiate the signal before turning the pumps on, the seed sources being deenergized after the pumps are on, the etalon pulses propagating around the ring cavity at a repetition rate different from a repetition rate of the signal pulses and, when coupled into the fiber amplifier, lower an accumulated energy therein to an energy level insufficient for developing Q-switch pulses in the ring cavity.

3. The fiber pulse generator of claim 2, wherein the central frequencies of respective optical filters spectrally do not overlap one another and block a continuous wave ("CW") radiation from propagating through the ring cavity or overlap so as to pass less than 0.1% of the CW radiation.

4. The fiber pulse generator of claim 1 further comprising a plurality of pumps each configured to:

initially output a pre-pulse sufficient to initiate noises within a required spectral region which includes at least one pitch propagating through the fiber amplifiers, fibers and filters of the respective two fiber chains to help develop the pitch to the signal with the desired spectral width and intensity, and thereafter output continuous wave (CW) radiation, the central frequencies of respective optical filters are spectrally spaced apart so that the bandpasses of respective optical filters overlap one another, a spectral region between overlapped bandpasses being configured to provide circulation of an unfiltered part of the CW radiation along the ring cavity sufficient to reduce an accumulated energy in the fiber amplifiers to a level insufficient for developing Q-switch pulses, the filters being configured with respective transmittance amplitudes which are equal to one another or different from one another.

5. The fiber pulse generator of claim 4, wherein the central frequencies of respective optical filters being spaced apart so that the bandpasses of respective filters overlap one another to define a spectral region therebetween configured to pass less than 10% of a maximum transmittance of one of the filters with a highest transmittance.

6. The fiber pulse generator of claim 5, wherein the overlapped zone is configured to pass at most 0.1% of a maximum transmittance of the other filter with a lowest transmittance.

7. The fiber pulse generator of claim 4, wherein the pre-pulse has a pulse duration which can vary from a fraction of a millisecond to several milliseconds and a power higher than that of the CW radiation.

8. The fiber pulse generator of claim 1, wherein the fiber chains each are configured to have a normal net dispersion or an anomalous net dispersion, the spectrally broadened signal pulse being temporally stretched while propagating through the fiber chains.

9. The fiber pulse generator of claim 1, wherein the fiber chains defining the ring cavity each are configured to have a zero net dispersion.

10. The fiber pulse generator of claim 1, wherein the spectrally broadened signal pulse is a linearly chirped pulse.

11. The fiber pulse generator of claim 1 further comprising an additional output coupler coupled to an output of the other optical fiber, wherein the pulse with the desired spectral width, intensity and energy is output from the ring cavity every half of the round trip.

12. The fiber pulse generator of claim 1, wherein the bandpasses of respective spectral filters have respective identical bandwidths or identical amplitude transmittances or identical bandwidths and transmittance amplitudes.

13. The fiber pulse generator of claim 1, wherein the bandpasses of respective spectral filters have different bandwidths with one of them being at most five times greater than the other one.

14. The fiber pulse generator of claim 1, wherein the fiber chains each is configured in a polarization maintaining (PM) format or not PM format.

15. The fiber pulse generator of claim 7, wherein sequentially launched etalon pulses have respective gradually decreasing amplitudes or uniform amplitudes to provide lowering of an energy accumulated in the fiber amplifiers to a level insufficient for developing Q-switch pulses in the ring cavity.

16. The fiber pulse generator of claim 1, wherein the fiber amplifiers each are configured to have a multimode core provided with opposite relatively small uniform diameter end regions and a central uniformly configured region having a diameter larger than that of the end regions, the multimode core being configured to support only a fundamental mode at an operating wavelength of the signal pulses.

17. The pulse generator of claim 1, wherein the fiber amplifiers each are configured with a single transverse mode active fiber.

18. The fiber pulse generator of claim 16 or 17 further comprising single transverse mode passive fibers coupled to the respective opposite ends of each amplifier.

19. The fiber pulse generator of claim 1 further comprising at least one isolator coupled between two fiber chains.

20. The fiber pulse generator of claim 2 further comprising input couplers guiding output of the plurality of pumps and the plurality of seed sources into the ring cavity.

21. The fiber pulse generator of claim 5 or 7 wherein the pumps are configured to side-pump or end-pump respective amplifiers.

22. The fiber pulse generator of claim 1 wherein the bandpasses of respective filters each are at narrower or broader than the desired spectral width of the pulse.

23. A ring cavity fiber laser for creating and outputting ultrafast pulses, comprising
a plurality of fiber chains coupled one to the other to define a ring cavity, each fiber chain including a fiber amplifier, a pulse chirping component, and an optical filter coupled to an output of the pulse chirping component and having a bandpass; and
an output coupler directly coupled to the output of the chirping component to guide the pulses outside the ring cavity, wherein bandpasses of respective optical filters of the fiber chains are centered on respective frequency components spectrally spaced from one another.

24. The ring cavity fiber laser of claim 23, wherein the pulse chirping component is a length of optical fiber.

25. A method of generating a train of ultrashort pulses in a fiber ring cavity laser, comprising:
sequentially passing a signal through shortpass and longpass spectral filters which are centered at respective spaced apart central wavelengths, thereby sequentially passing respective short-wavelength and long-wavelength sub-regions of a spectral region of the signal, and
decoupling an ultrashort pulse from the ring cavity at least once per round trip of the signal.

26. The method of claim 25 further comprising:
amplifying the signal before each filtering to a desired peak intensity; and
spectrally broadening the amplified signal in a fiber chirping component before filtering.

27. The method of claim 26, wherein the short-wavelength and long-wavelength filters have the respective central wavelengths spaced apart so that bandpasses of respective filters do not overlap one another.

28. The method of claim 26, wherein the short-wavelength and long-wavelength filters have the respective central wavelengths spaced apart so that bandpasses of respective filters overlap one another.

29. The method of claim 27 further comprising:
injecting one or more etalon pulses into the ring cavity for a first period of time;
initiating a CW radiation including CW and pitch components inside the ring cavity during the first period of time;
developing the pitch component to the signal; and
ceasing injecting the etalon pulses while developing the pitch component.

30. The method of claim 28 further comprising
injecting a pre-pulse of a pump into the ring cavity for a period of time; and
thereafter coupling a CW radiation into the ring cavity.

* * * * *